United States Patent
Thayer

[19]

[11] Patent Number: 6,154,279
[45] Date of Patent: Nov. 28, 2000

[54] METHOD AND APPARATUS FOR DETERMINING SHAPES OF COUNTERSUNK HOLES

[75] Inventor: Stephen W. Thayer, Satellite Beach, Fla.

[73] Assignee: John W. Newman, Newton Square, Pa.

[21] Appl. No.: 09/057,706

[22] Filed: Apr. 9, 1998

[51] Int. Cl.$^7$ .................................................. G01B 11/24
[52] U.S. Cl. ............................................................ 356/376
[58] Field of Search ............................................. 356/376

[56] References Cited

U.S. PATENT DOCUMENTS

| | | | |
|---|---|---|---|
| 4,741,621 | 5/1988 | Taft et al. | 356/376 |
| 4,894,551 | 1/1990 | Kishimoto et al. | 356/376 |
| 4,948,258 | 8/1990 | Caimi | 356/376 |
| 5,196,900 | 3/1993 | Pettersen | 350/376 |

*Primary Examiner*—Richard A. Rosenberger
*Attorney, Agent, or Firm*—William H. Eilberg

[57] ABSTRACT

The dimensions of a countersunk hole, or of a fastener head, are determined accurately and rapidly by a nondestructive measurement system. At least one laser projects spots of light onto the surface being analyzed. From knowledge of the projection angle, and of the lateral displacement of the spots of light caused by variations in the depth of the surface, one can calculate an actual depth of each point on the surface. A set of parameters defining a mathematical model of the hole or fastener head are fitted to a set of measured coordinates of points on the surface being analyzed, using conventional numerical techniques. The optimized parameters define the dimensions of the countersunk hole or fastener head. The present invention operates independently of the coordinate system used to perform the measurements, so the invention eliminates errors caused by misalignment of optical components. The invention can also provide automatic warnings when the dimensions of a particular countersunk hole or fastener heads exceed predetermined tolerances.

8 Claims, 6 Drawing Sheets

OPTICAL HEAD CONFIGURATION

FIG. 1

OPTICAL HEAD CONFIGURATION

FIG. 2

TOP VIEW

FIG. 3a

CROSS SECTION VIEW

METHOD AND APPARATUS FOR DETERMINING SHAPES OF COUNTERSUNK HOLES

BACKGROUND OF THE INVENTION

The present invention relates to the field of measurement and nondestructive testing, and provides an automated method and apparatus for determining the shape of a countersunk hole or a fastener head. More generally, the invention can be used to characterize any surface having variations in depth.

The present invention is especially useful in fields where fastener holes must be formed with precision. For example, the exterior surface of an aircraft is made of a plurality of aluminum or composite panels, the panels being held together by rivets or other fasteners. Countersunk holes are essential for the fasteners to achieve maximum strength. If the orientation of the fastener does not exactly coincide with that of the hole, the result can be an uneven stress concentration, and cracks can form and propagate from one hole to another. Mismatches in orientation between the fastener and the hole can result from holes which are drilled too deeply or not deeply enough, or from holes which are drilled at an angle instead of being normal to the panel surface. The problem of stress concentration is especially critical in the case of composites. However, the problem occurs with metal panels as well.

Countersunk holes are also used to minimize aerodynamic drag, as such holes enable the fastener heads to be positioned at or below the level of the surface of the panel. If the fastener holes are too shallow, the fastener heads will protrude beyond the surface, and will create excessive drag at high airspeeds.

The need for precision is not limited to countersunk holes, but also applies to fastener heads. If the fastener head is not shaped correctly, it may not fit perfectly within the fastener hole, thus compromising the strength of the joint. Also, if the fastener head is too large, it will protrude unduly, again causing unwanted drag.

The above-described problems can occur wherever fasteners must be inserted into holes with great precision. In high performance aircraft, even a slight protrusion of a few rivets can have a perceptible effect on the flying characteristics of the aircraft, and on its structural strength under high loads.

Thus, there is a need to know whether the dimensions of a countersunk hole, or of a fastener head, are within allowable limits. Since a given structure usually has a very large number of fasteners and holes, testing all of them can be difficult and time consuming. More significantly, all known prior art systems for performing such analysis are subject to errors caused by misalignment of the components used to perform the measurements.

The present invention provides a method and apparatus for determining the shape of a countersunk hole, and/or the shape of a fastener inserted in such a hole. The method and apparatus of the invention provide a nondestructive, automatic, and accurate technique for performing such analysis.

SUMMARY OF THE INVENTION

In the preferred embodiment, the apparatus of the present invention includes a pair of lasers, arranged such that at least one beam from one laser can reach essentially every point on the surface being examined. A charge coupled device (CCD) or equivalent is positioned to receive light reflected from the surface. A computer connected to the CCD camera stores a pattern of spots formed on the surface being analyzed, and also stores a pattern representing spots on a flat reference surface. The computer then processes the data according to the method described below.

Using the observed lateral displacement of each spot, caused by a change in the surface elevation at a particular point, and using knowledge of the projection angle of the incident light, the computer can easily calculate the depth of the surface, relative to an arbitrary reference plane, at each point. For each fastener or fastener hole, a collection of data points are obtained, the data points including sets of points $(x_i, y_i, z_i)$. In this notation, the z-coordinate represents depth, so the values of $x_i$ and $y_i$ are determined directly from the apparent position of each point on the two-dimensional image formed in the camera. The value of $z_i$ corresponds to the depth discussed above. A set of parameters describing a mathematical model of the hole or fastener are then "fit" to these measured data points. In one preferred embodiment, the hole is modeled as a right cone, and the parameters of the model are chosen so as to minimize the error between the modeled points and the observed points. These computed parameters then can be considered to characterize the hole.

The above analysis can be done automatically. The observations can be made virtually simultaneously for a large number of spots of light. Alternatively, individual beams of light can be moved over the surface in a controlled manner, and the observations taken for each spot on the surface. When the computer has stored a plurality of coordinates representing points on the surface being analyzed, it can then compute the parameters which most closely fit a model to the measured points.

The invention therefore has the primary object of providing a method and apparatus for quickly and accurately determining the shapes of countersunk holes and/or fasteners inserted in countersunk holes.

The invention has the further object of automating the process of determining the shapes of countersunk holes and/or fasteners.

The invention has the further object of providing an improved means for monitoring the quality of countersunk holes and/or fasteners.

The invention has the further object of providing a method and apparatus for characterizing countersunk holes and/or fasteners, regardless of the orientation of the axes of the hole or fastener, and regardless of the orientation of the surrounding surface.

The invention has the further object of providing a method and apparatus for automatically characterizing any surface having variations in depth.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
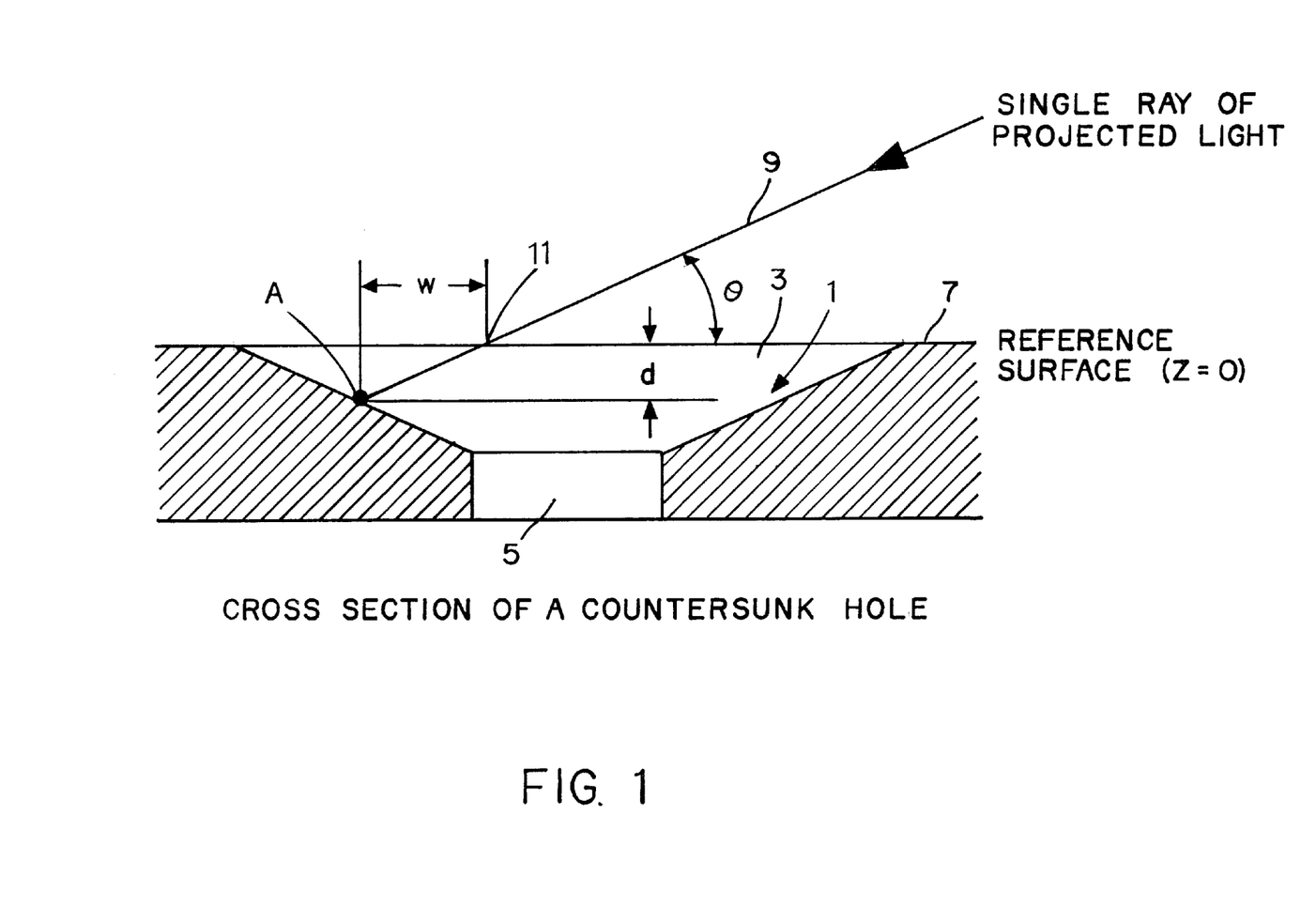
FIG. 1 provides a diagram showing the geometrical relationships which are used, in the present invention, to measure the depth of a point on the surface being analyzed.

FIG. 1 provides a diagram illustrating the geometrical relationships used to measure the depth of a point on the surface being inspected. Countersunk hole 1 includes a conical portion 3 and a cylindrical portion 5. The countersunk hole lies below a reference surface 7. In the coordinate system used herein, the x-y plane is perpendicular to the paper, and the z-axis is in the vertical direction, with the reference surface 7 representing the plane for which z=0.

Ray 9, preferably produced by a laser (not shown in FIG. 1) is directed towards the countersunk hole, and produces a spot of light at point A. The point identified by reference numeral 11 is the position at which the spot of light would be in the absence of the countersunk hole. That is, if reference surface 7 were flat, ray 9 would impinge on the surface at point 11, and would produce a spot of light there. Thus, w is the lateral displacement of spot A, due to the presence of the countersunk hole. In FIG. 1, d is the depth of spot A, as measured relative to the reference surface.

Since ray 9 makes an angle θ relative to the reference surface, it follows that $d = w \tan \theta$.

Thus, from knowledge of the lateral displacement of a ray of light, due to the presence of a countersunk hole (or other variation in depth of the surface being analyzed), and from knowledge of the projection angle, one can calculate the depth of any point illuminated by the laser.

The calculation outlined above presupposes that one knows the position of each spot of light in the absence of a countersunk hole. That is, to make the calculation, one must direct the laser onto a solid, flat surface, and must record the position of a given spot in the x,y plane. In practice, one records a large number of such x,y positions, for a large number of spots, and compares these positions with corresponding observed positions when a countersunk hole, or other surface feature, is present.

By placing a video camera above the reference surface, one can observe and record the position of each spot of light in the x,y plane. The latter statement is true because the camera simply acquires a two-dimensional image of the surface. The depth of each point, i.e. the z-coordinate, is obtained by use of the procedure described above. Thus, by shining coherent light on various points of the countersunk hole, one can easily obtain a set of coordinates $(x_i, y_i, z_i)$ which identify measured points taken along the surface being analyzed.

Figure 2:
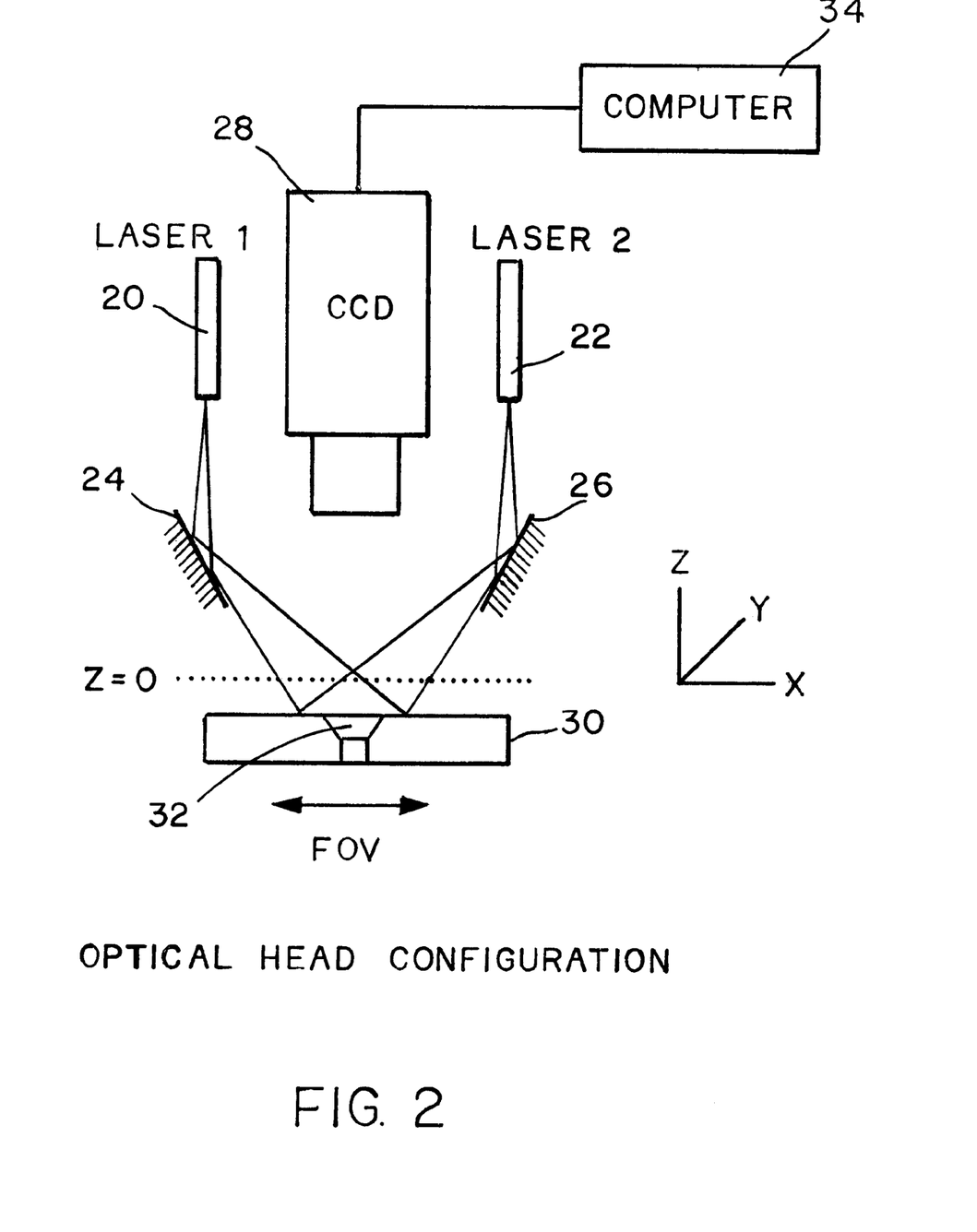
FIG. 2 provides a schematic and block diagram of the apparatus made according to the present invention.

FIG. 2 shows the preferred arrangement of components according to the present invention. Lasers 20 and 22 (which preferably are laser diodes) are positioned on either side of a video camera, shown as charge coupled device (CCD) 28. The light beams from the lasers are reflected by mirrors 24 and 26. The mirrors are movable, and therefore comprise means for directing the beam onto a desired point on the reference surface 30, or for positioning a pattern of spots over the area of interest. FIG. 2 shows the plane defined by z=0 to be offset from the reference surface; the position of this plane is arbitrary, and does not affect the operation of the model used in the present invention.

Each laser projects a plurality of spots of light onto the surface being analyzed. Alternatively, each laser could project a single spot, and the mirrors could be moved in appropriate ways, so that the laser beams could scan over the entire desired field of view (designated in the figure, in one dimension, as "FOV"). The field of view preferably includes the entire countersunk hole (or fastener head) plus a portion of the surrounding surface. FIG. 2 also shows countersunk hole 32, similar to that shown in FIG. 1. The CCD camera 28 observes spots of light formed on the reference surface and/or on points in the countersunk hole, and records images of such spots in its memory. The CCD camera is connected to computer 34 which processes the images according to the present invention. The computer digitizes and stores the images formed in the camera, and does the computations, described below, which fit a model to the stored data. The computer can also comprise means for controlling the movement of the lasers and/or the mirrors.

The reason for using two lasers 20 and 22 is to improve the coverage of the desired field of view. Because the purpose of the invention is to characterize countersunk holes and/or protruding fasteners, or other surface features involving variations in depth, there will, in general, be points which are not easily illuminated by one of the lasers. The preferred projection angle from each laser is about 45°.

Each laser preferably projects a grid of spots, so that the analysis of many spots can be made from a single image. Using two lasers insures that all points in the desired field of view can be illuminated by at least one laser. The lasers are not used to produce mutually interfering beams. Instead, they produce patterns of spots which are mutually interleaved, and which therefore enhance the coverage of the area of interest.

It is also possible to practice the invention with only one laser, and to observe fewer points. Alternatively, one could provide means for moving a single laser and/or mirror to allow it to scan the entire desired field of view.

The analysis of the data is based on the general principle described with respect to FIG. 1. When a flat surface is observed by the CCD camera, the projected laser grid patterns will appear undistorted. Any variation in surface elevation will result in a lateral displacement of some of the spots, for the reason described above. Since the extent of lateral displacement of each spot is directly proportional to the change in surface elevation at the particular point being observed, the computer can easily deduce the depth of each spot based on its observed lateral displacement, since the projection angle is already known. The device can be calibrated by observing displacements of grid spots for a series of known surface elevations.

When the CCD camera is positioned to observe a countersunk hole (or a fastener head), and when the pair of laser grids are projected onto the area of interest, a single image will be acquired by the computer. The displaced position of each laser spot is determined and the corresponding depth for that position is computed. The depths are referenced to an arbitrary plane (z=0) in a rectangular coordinate system. Thus, the computer can determine and store a plurality of points $(x_i, y_i, z_i)$, which points represent actual positions on the surface of the countersunk hole or fastener head.

Figure 3A:
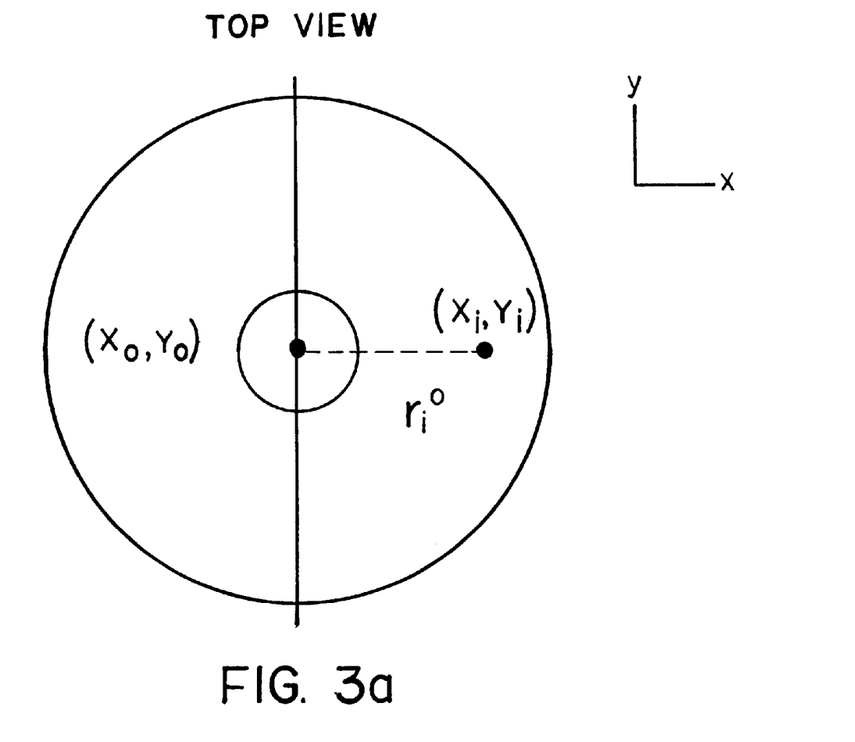
FIGS. 3a and 3b provide diagrams showing the parameters of the model of a right cone, used to approximate the countersunk hole in the present invention, for the case in which the axis of the countersunk hole is parallel to the axis of the camera.
Figure 3B:
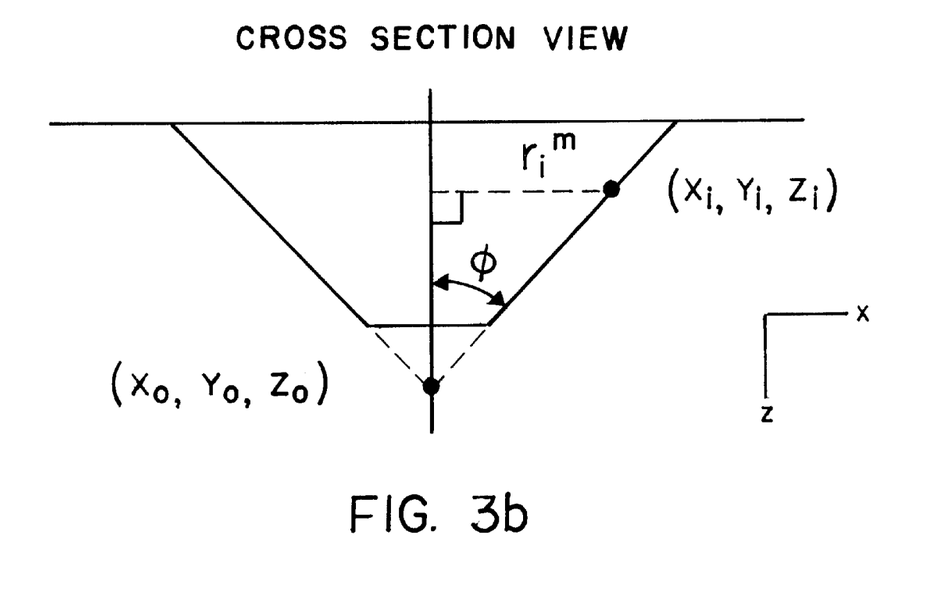

FIGS. 3a and 3b are used to describe the computations performed on the data acquired by the CCD camera, in one simple example, in which a countersunk hole is modeled as a right cone. A further simplifying assumption is that the axis of the countersunk hole is aligned with the optical axis of the camera. In other words, in FIGS. 3a and 3b, it is assumed that the camera looks directly down at the countersunk hole.

In the example of FIGS. 3a and 3b, the countersunk hole is modeled as a right circular cone having an apex at the point $(x_0, y_0, z_0)$ and wherein the side of the cone makes an angle $\phi$ relative to the axis of the cone. The angle $\phi$ can be considered the half-angle of the cone. According to the procedure of the present invention, one obtains a plurality of measured points $(x_i, y_i, z_i)$ and uses these points to solve for model parameters which produce a cone which most closely fits with the observed data.

In particular, the radius of the cone at any particular measurement point can be determined in two ways, namely according to a direct observation and according to the model. FIG. 3a shows a top view which shows the observed radius $r_i^o$. This observed radius is simply the lateral distance (i.e. the distance as viewed from above, without regard to depth) between the apex $(x_0, y_0)$ and the observed point $(x_i, y_i)$. Because the hole is viewed from directly above, the z coordinate can be ignored. The observed radius is therefore $$r_i^o = [(x_i - x_0)^2 + (y_i - y_0)^2]^{1/2}.$$

A second equation for the radius of the cone is obtained from the model. As shown in the cross-sectional view of FIG. 3b, the modeled radius $r_i^m$ is obtained as follows:

$$r_i^m = \sin\phi[(x_i - x_0)^2 + (y_i - y_0)^2 + (z_i - z_0)^2]^{1/2}.$$

In the latter equation, the model is "fit" to the data. That is, one assumes that the observed point $(x_i, y_i, z_i)$ lies on a cone having an apex at $(x_0, y_0, z_0)$ and having a half-angle $\phi$.

Thus, the difference between the observed radius and the modeled radius, for a particular point $(x_i, y_i, z_i)$, is given by $$\sin\phi[(x_i - x_0)^2 + (y_i - y_0)^2 + (z_i - z_0)^2]^{1/2} - [(x_i - x_0)^2 + (y_i - y_0)^2]^{1/2},$$

which is a function of $x_i$, $y_i$, $z_i$, and $\phi$.

By taking n measurements, one obtains n expressions of the type shown above, and the problem is then to choose the values of $x_0$, $y_0$, $z_0$, and $\phi$ which minimize an error function which is built up from such expressions. For example, one could construct the following error function F:

$$F = \sum_{i=1}^{n} \left( \sin\phi[(x_i - x_0)^2 + (y_i - y_0)^2 + (z_i - z_0)^2]^{1/2} - [(x_i - x_0)^2 + (y_i - y_0)^2]^{1/2} \right)^2$$

One must choose the values of the model parameters $x_0$, $y_0$, $z_0$, and $\phi$ which minimize F. This is a well-known "least squares" procedure, since F is defined as the sum of the squared errors. Methods for numerically minimizing this error function are known, and do not themselves form part of the present invention.

One very simple way of determining the optimal parameters is to use an iterative technique by computer. The computer could be programmed to try many possible values of the model parameters, within a predetermined boundary area, and to select the set of values which minimizes the error function. But the invention is not limited to any particular means of minimizing error; other, more sophisticated numerical techniques could be used instead. What is important is that the model parameters are chosen to produce the best fit between the observed data and the model.

The dimensions of the countersunk hole that are generally of interest include the outer diameter of the countersink, the included countersink angle, and the azimuth and angle of inclination of the countersink axis relative to the surrounding surface. In the above example, the parameters $x_0$, $y_0$, $z_0$, and $\Phi$ clearly define the outer diameter of the countersink, and the included angle is computed as $2\Phi$. As noted earlier, the above example assumes that the axis of the countersunk hole is aligned with the optical axis of the camera.

Figure 4:
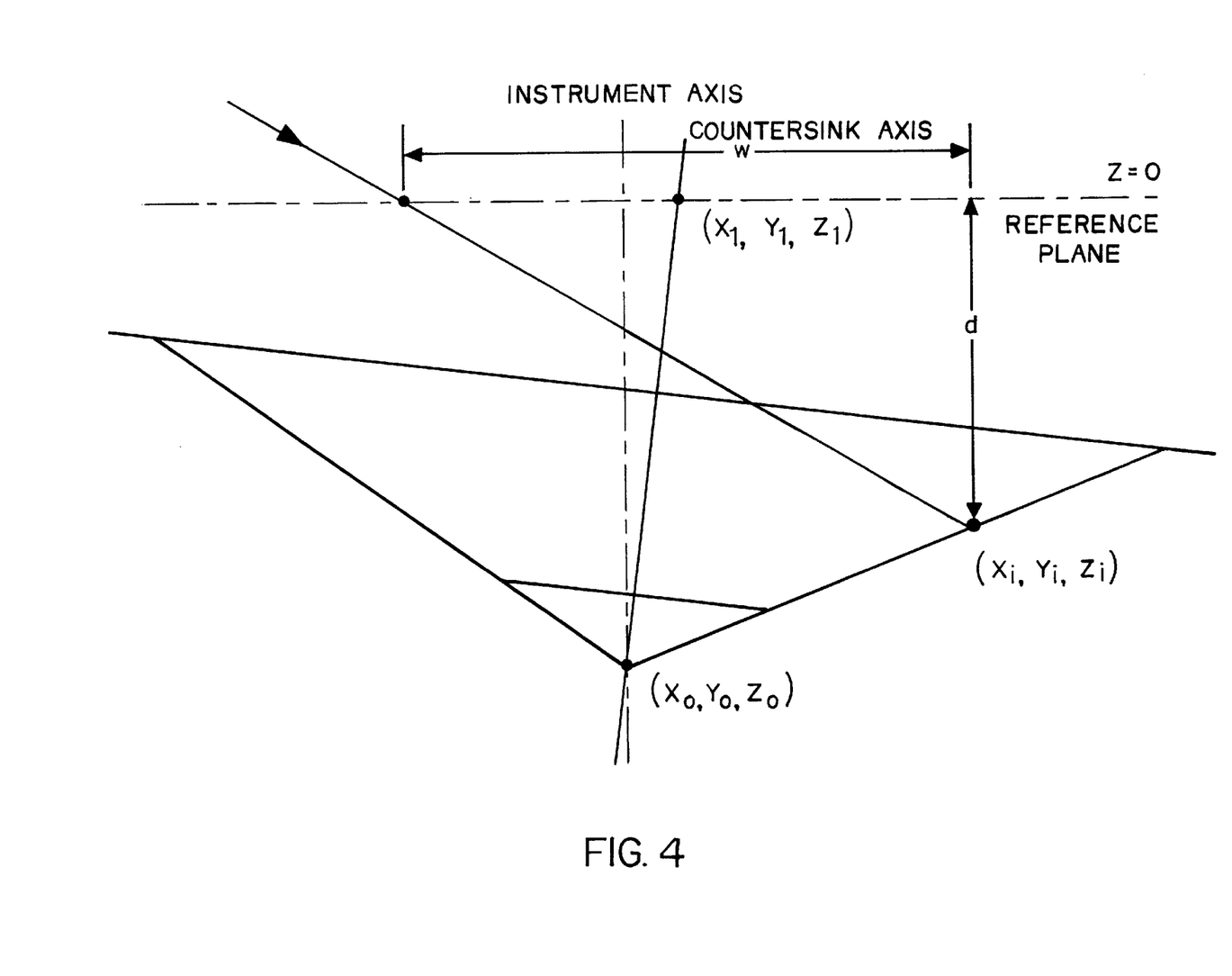
FIGS. 4, 5, and 6 provide diagrams which illustrate a procedure for determining parameters of a model of a countersunk hole, wherein the axis of the countersunk hole is oblique relative to the axis of the camera.
Figure 5:
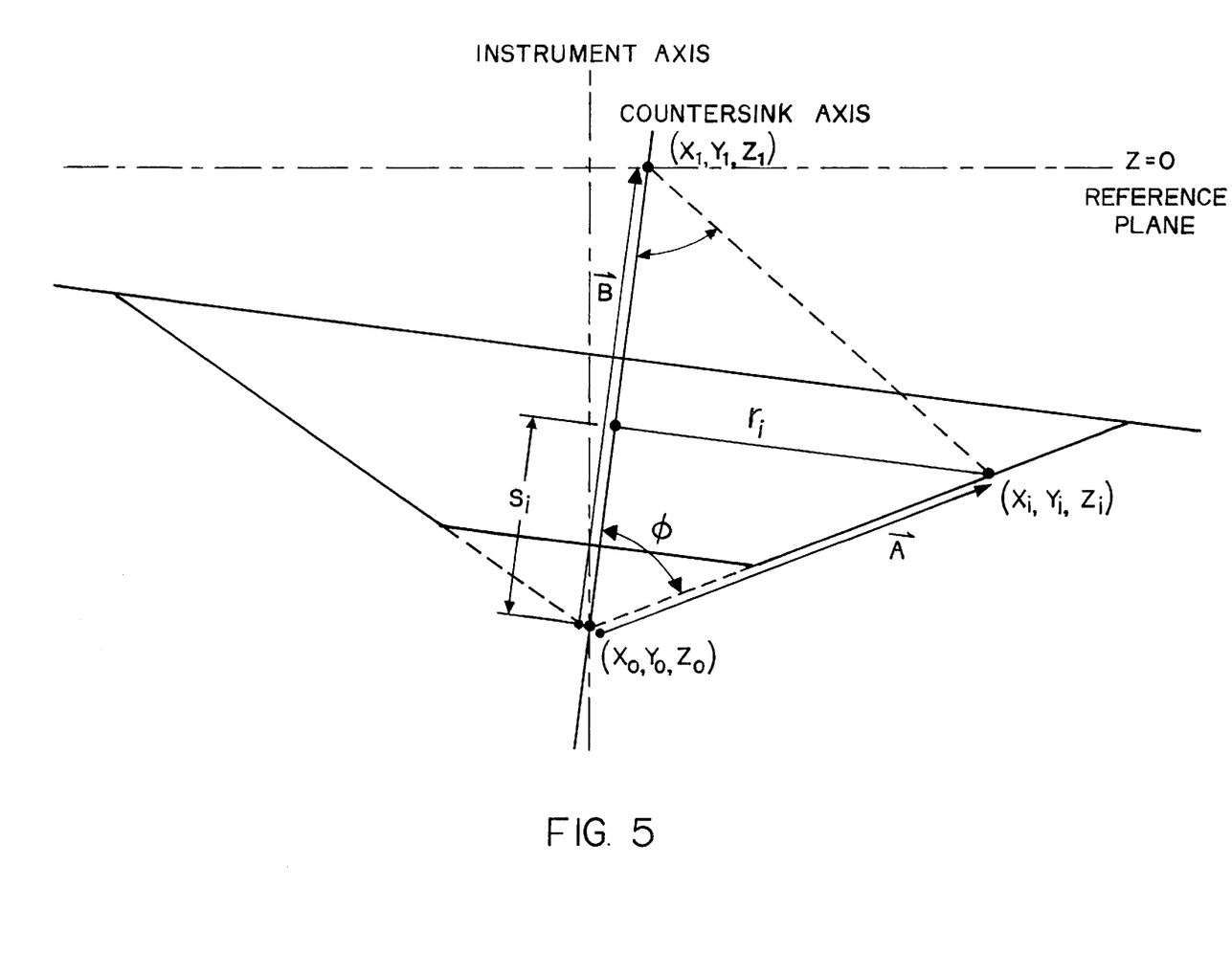
Figure 6:
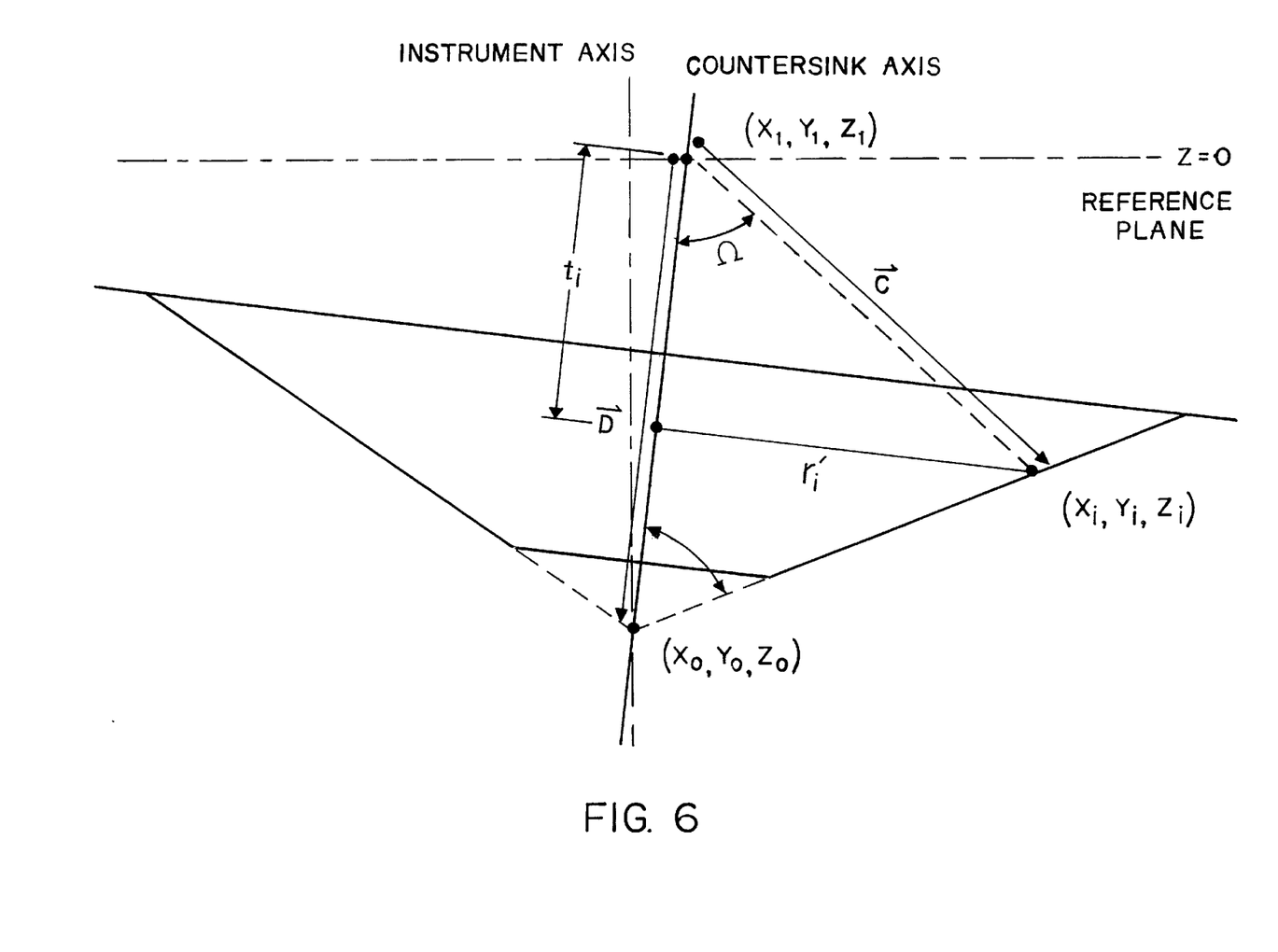

The invention is not limited to the special case wherein the optical axis of the camera is aligned with the axis of the countersunk hole. FIGS. 4, 5, and 6 illustrate the determination of parameters of a model of a countersunk hole having an axis which is oblique relative to the axis of the CCD camera or other observing instrument.

As shown in FIG. 4, the axis of the countersunk hole is oblique to the instrument reference plane $z = 0$. Thus, FIG. 4 depicts the case in which the camera is tilted relative to the countersunk hole and the surrounding surface. The procedure described below also applies to the case in which the axis of the countersunk hole is tilted relative to the surrounding surface.

The depths $z_i$ at each point $(x_i, y_i)$ are calculated in the same manner as before. Thus, one obtains a set of points $(x_i, y_i, z_i)$ representing measured points located on the surface of the countersunk hole. All depths $z_i$ are taken relative to the instrument reference plane $z = 0$. The $z = 0$ plane represents the plane where the calibration data points were established.

The apex of the countersunk hole is shown as the point $(x_0, y_0, z_0)$. The point at which the axis of the countersunk hole intersects the reference plane is $(x_1, y_1, z_1)$. By definition, $z_1$ is zero. In this general case, the countersunk hole is again modeled as a cone, but is defined by parameters $x_0$, $y_0$, $z_0$, $\phi$, $x_1$, and $y_1$. That is, one must determine values for these six parameters.

The parameters can be determined by writing an equation for the radius of the cone, at any particular measurement point, in two ways. The first way is illustrated in FIG. 5. FIG. 5 shows vectors A and B which are defined as $$A = (x_i - x_0)i + (y_i - y_0)j + (z_i - z_0)k$$

and $$B = (x_1 - x_0)i + (y_1 - y_0)j + (z_1 - z_0)k$$

where i, j, and k are unit vectors in the x, y, and z directions.

The distance $s_i$ in FIG. 5 is the projection of vector A on vector B. From elementary vector analysis, one can show that $$s_i = B(A \cdot B)/(B \cdot B)$$

Thus, the radius $r_i$ is computed by $$r_i = s_i \tan\phi = (B\,(A \cdot B)/(B \cdot B))\tan\phi.$$

FIG. 6 illustrates the derivation of another equation for the radius, labeled $r_i'$. The calculations are based on vectors C and D, defined as $$C = (x_i - x_1)i + (y_i - y_1)j + (z_i - z_1)k$$

and $$D = (x_0 - x_1)i + (y_0 - y_1)j + (z_0 - z_1)k.$$

The distance $t_i$ is computed as the projection of vector C on vector D. Thus, $$t_i = D(C \cdot D)/(D \cdot D)$$

and $$r_i' = t_i \tan\psi = D(C \cdot D)/(D \cdot D)\tan\psi.$$

The above equation gives rise to a new, and unwanted, unknown variable $\psi$, but this variable can be eliminated by writing $v$ in terms of the scalar product of vectors C and D, and substituting the expression for $v$ into the previous equation:

$$r_i' = D(C \cdot D)/(D \cdot D) \tan[\cos^{-1}((C \cdot D)/|C||D|)].$$

As in the previously described procedure, one now has two expressions for the same radius. As before, one can write an error function F which, in one example, is the sum of the squared differences between each of the two corresponding radii:

$$F = \sum_{i=1}^{n} (r_i - r_i')^2.$$

From the preceding equations, it is apparent that F can be written as a function of $x_0$, $y_0$, $z_0$, $x_1$, $y_1$, and $\phi$. In a similar manner to that employed in the previous example, one chooses values of these parameters which minimize F. When these parameters are determined, one can write the vector for the axis of the countersunk hole as $$V = (x_1 - x_0)i + (y_1 - y_0)j + (z_1 - z_0)k.$$

The orientation of vector V indicates how the camera was tilted with respect to the countersunk hole. If both the i and j components of V are zero, then the camera was normal to the countersunk hole when the measurement was taken. More importantly, if one uses a similar procedure to solve for the surrounding surface, the difference between the surface normal vector and V provides the angle at which the countersunk hole was drilled relative to the surrounding surface.

The invention is not limited to analysis of countersunk holes, but can also be used to measure the height of a fastener above (or below) the surrounding surface. The details of a model which would describe the fastener head would be somewhat different from those shown above, but the principle is the same.

The invention can be generalized still further; it can analyze surface features other than countersunk holes or fastener heads. Indeed, the invention can be used to characterize any surface feature which includes a variation in depth, as long as one can postulate a model of the surface being characterized.

In the examples described above, the lasers created spots of light which were observed directly by the CCD camera. An alternative method uses projected shadows instead of projected light. The pattern of shadows can be analyzed in essentially the same manner used with projected light, and the computations described above are still valid. Projected shadows may be advantageous when making depth measurements on certain types of highly reflective surfaces.

In another alternative, multiple light beams, or arrays of discrete spots of light, can be projected onto the surface. All such alternative ways of illuminating the surface are within the scope of the present invention.

The present invention does not require that the countersunk hole be modeled as a right cone. Also, the surrounding surface area need not be modeled as a flat plate, but instead could be modeled as a cylinder or sphere if the assumption of a flat plate is not appropriate.

Note also that since the model of the countersunk hole or fastener head may include a model of the surrounding surface, the parameters of the model can be used to determine the nominal surface normal vector. The latter can be compared to the axis of the countersunk hole to determine the angle at which the countersunk hole was drilled.

The examples shown in FIGS. 1–3 pertain to a countersunk hole and not a fastener head. But a model of a fastener head can be constructed very easily. For example, one can assume that the fastener head is hemispherical, with a surrounding surface that is a flat plate. Variations on the latter can be constructed, if the latter model is not sufficiently accurate. The same type of calculations can then be done with respect to the fastener head as are done with respect to the countersunk hole.

The apparatus and method of the present invention provide a more accurate and more complete characterization of countersunk holes and/or fastener heads, as compared with prior art techniques, while significantly reducing the possibility of measurement errors caused by instrument misalignment. The results obtained from the present invention are based on data taken over the entire area of the hole or fastener, typically using 25–35 measurement points, so that the results are more precise and repeatable than those obtained using instruments which rely on measurement of only a single point.

Another advantage of the present invention is that its results are independent of the orientation of the coordinate system used. Thus, the computed parameters of the countersunk holes or fastener heads will not be affected by minor variations in instrument orientation. The latter feature constitutes a major improvement over mechanical countersink gauges of the prior art, which require precise alignment for accurate results.

Still another advantage of the present invention is its ability to generate error statistics. For example, consider the case of a countersunk hole. Suppose that the dimensions of interest are the outer diameter of the countersink and the angle defined by the countersunk hole. One could place error bounds on these dimensions. Then, if the computed model parameters imply that either of these dimensions fall outside the desired limits, the computer can provide an appropriate warning. Similarly, if the apparatus fails to provide sufficient data to enable the numeric model to converge, the system can also report an error condition. These features significantly reduce the possibility of erroneous results due to equipment malfunction or misuse.

While the invention has been described with respect to certain preferred embodiments, other variations are possible within the scope of the invention. The details of the model of the countersunk hole or fastener head can be varied to suit particular applications. The arrangement of the lasers can be modified. Different algorithms for fitting the model parameters to the measured data can be used. The invention is not limited to use with coherent or structured light, although such light is preferred, because it produces well-defined spots. These and other variations, which will be apparent to those skilled in the art, should be considered within the spirit and scope of the following claims.

What is claimed is:

1. A method of determining an orientation of a camera used to observe a countersunk hole, the method comprising the steps of:

a) electronically measuring coordinates of a plurality of points on a countersunk hole, the countersunk hole having an axis and an apex, and storing said coordinates in a memory of a computer, said coordinates of each of said plurality of points being designated by ($x_i$, $y_i$, $z_i$), b) deriving two distinct expressions for a radius of the countersunk hole corresponding to each of said points, wherein said expressions are functions of $x_0$, $y_0$, $z_0$, $x_1$, $y_1$, and $\phi$, where ($x_0$, $y_0$, $z_0$) is the apex of the countersunk hole, $(x_1, y_1, z_1)$ is a point at which the axis of the countersunk hole intersects a reference plane $z=z_1=0$, and $\phi$ is an angle between the axis of the countersunk hole and a line connecting the apex of the countersunk hole and one of the points $(x_i, y_i, z_i)$, c) selecting values of parameters $x_0, y_0, z_0, x_1, y_1$, and $\phi$ so as to minimize an error function comprising a comparison of said two distinct expressions, d) determining an orientation of vector V defined by $$V=(x_1-x_0)i+(y_1-y_0)j+(z_1-z_0)k$$

wherein the orientation of V corresponds to an orientation of the camera with respect to the countersunk hole.

2. The method of claim 1, wherein the expressions derived in step (b) are computed to be:

$$r_i = s_i \tan\phi = (B(A\cdot B)/(B\cdot B))\tan\phi$$

and $$r_i' = D(C\cdot D)/(D\cdot D)\tan[\cos^{-1}((C\cdot D)/|C||D|)]$$

where A is a vector extending from the apex of the countersunk hole to one of said points $(x_i, y_i, z_i)$, B is a vector extending from the apex of the countersunk hole to the point $(x_1, y_1, z_1)$, C is a vector from the point $(x_1, y_1, z_1)$ to one of said points $(x_i, y_i, z_i)$, and D is a vector from the point $(x_1, y_1, z_1)$ to the apex of the countersunk hole.

3. A method of determining an orientation of a countersunk hole relative to a surrounding surface, the method comprising the steps of:

a) using a camera to measure coordinates of a plurality of points on a countersunk hole, the countersunk hole having an axis and an apex, and storing said coordinates in a memory of a computer, said coordinates of each of said plurality of points being designated by $(x_i, y_i, z_i)$, b) deriving two distinct expressions for a radius of the countersunk hole corresponding to each of said points, wherein said expressions are functions of $x_0, y_0, z_0, x_1, y_1$, and $\phi$, where $(x_0, y_0, z_0)$ is the apex of the countersunk hole, $(x_1, y_1, z_1)$ is a point at which the axis of the countersunk hole intersects a reference plane $z=z_1=0$, and $\phi$ is an angle between the axis of the countersunk hole and a line connecting the apex of the countersunk hole and one of the points $(x_i, y_i, z_i)$, c) selecting values of parameters $x_0, y_0, z_0, x_1, y_1$, and $\phi$ so as to minimize an error function comprising a comparison of said two distinct expressions, d) determining an orientation of vector V defined by $$V=(x_1-x_0)i+(y_1-y_0)j+(z_1-z_0)k$$

wherein the orientation of V corresponds to an orientation of the camera with respect to the countersunk hole, e) repeating step (a) to determine a second plurality of points on a surrounding surface of the countersunk hole, and using said second plurality of points to determine a surface normal vector V', and f) using a difference between V and V' to calculate an angle at which the countersunk hole was drilled relative to the surrounding surface.

4. The method of claim 3, wherein the expressions derived in step (b) are computed to be:

$$r_i = s_i \tan\phi = (B(A\cdot B)/(B\cdot B))\tan\phi$$

and $$r_i' = D(C\cdot D)/(D\cdot D)\tan[\cos^{-1}((C\cdot D)/|C||D|)]$$

where A is a vector extending from the apex of the countersunk hole to one of said points $(x_i, y_i, z_i)$, B is a vector extending from the apex of the countersunk hole to the point $(x_1, y_1, z_1)$, C is a vector from the point $(x_1, y_1, z_1)$ to one of said points $(x_i, y_i, z_i)$, and D is a vector from the point $(x_1, y_1, z_1)$ to the apex of the countersunk hole.

5. An apparatus for determining an orientation of a camera used to observe a countersunk hole, comprising:

a) means for electronically measuring coordinates of a plurality of points on a countersunk hole, the countersunk hole having an axis and an apex, and for storing said coordinates in a memory of a computer, said coordinates of each of said plurality of points being designated by $(x_i, y_i, z_i)$, b) means for deriving two distinct expressions for a radius of the countersunk hole corresponding to each of said points, wherein said expressions are functions of $x_0, y_0, z_0, x_1, y_1$, and $\phi$, where $(x_0, y_0, z_0)$ is the apex of the countersunk hole, $(x_1, y_1, z_1)$ is a point at which the axis of the countersunk hole intersects a reference plane $z=z_1=0$, and $\phi$ is an angle between the axis of the countersunk hole and a line connecting the apex of the countersunk hole and one of the points $(x_i, y_i, z_i)$, c) means for selecting values of parameters $x_0, y_0, z_0, x_1, y_1$, and so as to minimize an error function comprising a comparison of said two distinct expressions, d) means for determining an orientation of vector V defined by $$V=(x_1-x_0)i+(y_1-y_0)j+(z_1-z_0)k$$

wherein the orientation of V corresponds to an orientation of the camera with respect to the countersunk hole.

6. The apparatus of claim 5, wherein the means for deriving includes means for computing said expressions by the formulas:

$$r_i = s_i \tan\Phi = (B(A\cdot B)/(B\cdot B))\tan\phi$$

and $$r_i' = D(C\cdot D)/(D\cdot D)\tan[\cos^{-1}((C\cdot D)/|C||D|)]$$

where A is a vector extending from the apex of the countersunk hole to one of said points $(x_i, y_i, z_i)$, B is a vector extending from the apex of the countersunk hole to the point $(x_1, y_1, z_1)$, C is a vector from the point $(x_1, y_1, z_1)$ to one of said points $(x_i, y_i, z_i)$, and D is a vector from the point $(x_1, y_1, z_1)$ to the apex of the countersunk hole.

7. An apparatus for determining an orientation of a countersunk hole relative to a surrounding surface, comprising:

a) means for manipulating a camera so as to measure coordinates of a plurality of points on a countersunk hole, the countersunk hole having an axis and an apex, and means for storing said coordinates in a memory of a computer, said coordinates of each of said plurality of points being designated by $(x_i, y_i, z_i)$, b) means for deriving two distinct expressions for a radius of the countersunk hole corresponding to each of said points, wherein said expressions are functions of $x_0$, $y_0$, $z_0$, $x_1$, $y_1$, and $\phi$, where $(x_0, y_0, z_0)$ is the apex of the countersunk hole, $(x_1, y_1, z_1)$ is a point at which the axis of the countersunk hole intersects a reference plane $z=z_1=0$, and $\phi$ is an angle between the axis of the countersunk hole and a line connecting the apex of the countersunk hole and one of the points $(x_i, y_i, z_i)$, c) means for selecting values of parameters $x_0$, $y_0$, $z_0$, $x_1$, $y_1$, and so as to minimize an error function comprising a comparison of said two distinct expressions, d) means for determining an orientation of vector V defined by $$V=(x_1-x_0)i+(y_1-y_0)j+(z_1-z_0)k$$

wherein the orientation of V corresponds to an orientation of the camera with respect to the countersunk hole, e) means for determining a vector V' representing an orientation of a surrounding surface of the countersunk hole, and f) means for calculating a difference between V and V' and for using said difference to determine an angle at which the countersunk hole was drilled relative to the surrounding surface.

8. The apparatus of claim 7, wherein the means for deriving include means for computing said expressions by the formulas:

$$r_i = s_i \tan \phi = (B(A \cdot B)/(B \cdot B)) \tan \phi$$

and $$r_1' = D(C \cdot D)/(D \cdot D) \tan [\cos^{-1}((C \cdot D)/|C| |D|)]$$

where A is a vector extending from the apex of the countersunk hole to one of said points $(x_i, y_i, z_i)$, B is a vector extending from the apex of the countersunk hole to the point $(x_1, y_1, z_1)$, C is a vector from the point $(x_1, y_1, z_1)$ to one of said points $(x_i, y_i, z_i)$, and D is a vector from the point $(x_1, y_1, z_1)$ to the apex of the countersunk hole.

\* \* \* \* \*